(12) United States Patent
Nakai et al.

(10) Patent No.: US 10,833,349 B2
(45) Date of Patent: Nov. 10, 2020

(54) ENERGY STORAGE DEVICE

(71) Applicant: GS Yuasa International Ltd., Kyoto (JP)

(72) Inventors: Kenta Nakai, Kyoto (JP); Tomonori Kako, Kyoto (JP); Akihiko Miyazaki, Kyoto (JP); Sumio Mori, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 791 days.

(21) Appl. No.: 15/068,915

(22) Filed: Mar. 14, 2016

(65) Prior Publication Data

US 2016/0276702 A1    Sep. 22, 2016

(30) Foreign Application Priority Data

Mar. 17, 2015 (JP) .................................. 2015-053074

(51) Int. Cl.
  *H01M 10/04* (2006.01)
  *H01M 10/0583* (2010.01)
  (Continued)

(52) U.S. Cl.
  CPC ........ *H01M 10/0459* (2013.01); *H01G 11/12* (2013.01); *H01G 11/26* (2013.01); *H01G 11/52* (2013.01); *H01G 11/76* (2013.01); *H01G 11/82* (2013.01); *H01M 2/1673* (2013.01); *H01M 10/0583* (2013.01); *H01G 11/06* (2013.01); *Y02E 60/13* (2013.01)

(58) Field of Classification Search
  CPC ......... H01M 10/0459; H01M 10/0583; H01M 2/1673; H01M 10/052; H01M 10/045; H01M 2/1653; H01M 2/1646; H01M 2/1686; H01M 2/166; H01M 2/168; H01G 11/52; H01G 11/82; H01G 11/84; H01G 11/26; H01G 11/76; H01G 11/12; H01G 11/06; Y02E 60/13
  See application file for complete search history.

(56) References Cited

U.S. PATENT DOCUMENTS 7,976,977 B2 * 7/2011 Kim .................... H01M 2/1646
                                                   429/144
10,297,805 B2 * 5/2019 Suzuki .................. H01M 2/166
(Continued)

FOREIGN PATENT DOCUMENTS

JP    2003-523059 A    7/2003
JP    2009-505366 A    2/2009
(Continued)

*Primary Examiner* — Stephen J Yanchuk
(74) *Attorney, Agent, or Firm* — McGinn I. P. Law Group, PLLC

(57) ABSTRACT

An energy storage device includes: an electrode assembly which includes: an approximately rectangular positive electrode; an approximately rectangular negative electrode which is stacked alternately with the positive electrode; and a strip-like elongated separator having a base material layer and an inorganic layer which is made to overlap with the first base material layer, wherein the elongated separator is arranged between the positive electrode and the negative electrode, and the base material layer of the elongated separator faces the negative electrode in an opposed manner between the positive electrode and the negative electrode.

20 Claims, 14 Drawing Sheets

(51) Int. Cl.
*H01M 2/16* (2006.01)
*H01G 11/52* (2013.01)
*H01G 11/26* (2013.01)
*H01G 11/76* (2013.01)
*H01G 11/82* (2013.01)
*H01G 11/12* (2013.01)
*H01G 11/06* (2013.01)

(56) References Cited

U.S. PATENT DOCUMENTS

| | | |
|---|---|---|
| 2002/0160257 A1 | 10/2002 | Lee et al. |
| 2003/0148178 A1* | 8/2003 | Kaneta ............... H01M 2/0275 429/162 |
| 2007/0184350 A1 | 8/2007 | Kim et al. |
| 2010/0261047 A1 | 10/2010 | Kim et al. |
| 2010/0261065 A1* | 10/2010 | Babinec ............... H01M 2/166 429/246 |
| 2011/0217586 A1 | 9/2011 | Kim et al. |
| 2012/0107573 A1* | 5/2012 | Iwata .................... C09J 123/22 428/189 |
| 2013/0011715 A1 | 1/2013 | Lee et al. |
| 2013/0130083 A1 | 5/2013 | Park et al. |
| 2014/0045032 A1 | 2/2014 | Tanaka et al. |
| 2015/0280185 A1* | 10/2015 | Lampe-Onnerud ..... H01M 2/34 429/9 |
| 2017/0084896 A1 | 3/2017 | Park et al. |

FOREIGN PATENT DOCUMENTS

| | | |
|---|---|---|
| JP | 2010-525542 A | 7/2010 |
| JP | 2013-530510 A | 7/2013 |
| JP | 2013-191485 A | 9/2013 |
| JP | 2014-035955 A | 2/2014 |
| JP | 2014-524112 A | 9/2014 |

* cited by examiner

ENERGY STORAGE DEVICE

CROSS-REFERENCE TO RELATED APPLICATIONS

This application claims the benefit of Japanese patent application No. 2015-053074, filed on Mar. 17, 2015, which is incorporated by reference.

FIELD

The present invention relates to an energy storage device equipped with an electrode assembly having a positive electrode, a negative electrode and a separator.

BACKGROUND

Conventionally, there has been known an electrochemical element used as an energy storage device such as a battery, which includes a rectangular cathode and a rectangular anode arranged alternately and an elongated separator (see JP-T-2010-525542, for example). To be more specific, as shown in FIG. 13, the electrochemical element includes a plurality of rectangular cathodes 101, a plurality of rectangular anodes 102, a plurality of rectangular first separators 103, and an elongated second separator 104. The cathodes 101 and the anodes 102 form a plurality of unit cells 105 where the cathode 101 and the anode 102 are alternately arranged with the first separator 103 interposed therebetween. These plurality of unit cells 105 are configured such that the unit cells 105 arranged adjacently to each other are arranged in a raw so as to make the cathode 101 and the anode 102 face each other in an opposed manner. Further, as shown in FIG. 14, the elongated second separator 104 includes: a strip-like polyolefin-based porous base material (polyethylene, polypropylene, a mixture of these resins or the like) 106 having thermally easily shrinkable property; and a pair of porous coating layers 107 having a thermally hardly shrinkable property which is made to overlap with both surfaces of the polyolefin-based porous base material 106. As shown in FIG. 13, the second separator 104 is arranged so as to make the respective unit cells 105 spaced apart from each other.

According to the above-mentioned electrochemical element 100, the second separator 104 includes the porous coating layer 107. Accordingly, even when a metal piece or the like pierces the energy storage device which comprises the electrochemical element 100, a hole formed in the second separator 104 by the metal piece or the like is thermally shrunken due to heat generated by short-circuiting between the cathode 101 and the anode 102 through the hole so that sudden spreading of the hole can be prevented. Thus, it is possible to prevent the increase in a contact (short-circuiting) area between the cathode 101 and the anode 102 arranged adjacently to each other with the second separator 104 interposed therebetween. As a result, safety of the energy storage device can be ensured.

Further, compared to an electrode assembly which is formed by alternately stacking a rectangular cathode and a rectangular anode with a rectangular separator interposed therebetween, with the use of the elongated second separator 104, the respective cathodes and the respective anodes are positioned by the second separator 104 and hence, the cathodes and the anodes are minimally displaced from each other.

However, in the electrochemical element including the elongated second separator having the porous coating layer, there may be a case where a capacity retention ratio (available-capacity retention ratio) or an output retention ratio of the electrochemical element (the energy storage device comprising the electrochemical element) is largely lowered.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage device equipped with an electrode assembly which includes an elongated separator having an inorganic layer and minimally lowers a capacity retention ratio or an output retention ratio.

According to an aspect of the present invention, there is provided an energy storage device which includes: an electrode assembly which includes: at least one approximately rectangular positive electrode; at least one approximately rectangular negative electrode which is stacked alternately with the positive electrode; and a strip-like elongated separator having a first base material layer and a first inorganic layer which is made to overlap with the first base material layer, wherein the elongated separator is arranged between the positive electrode and the negative electrode, and the first base material layer of the elongated separator is configured to face the negative electrode in an opposed manner between the positive electrode and the negative electrode.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
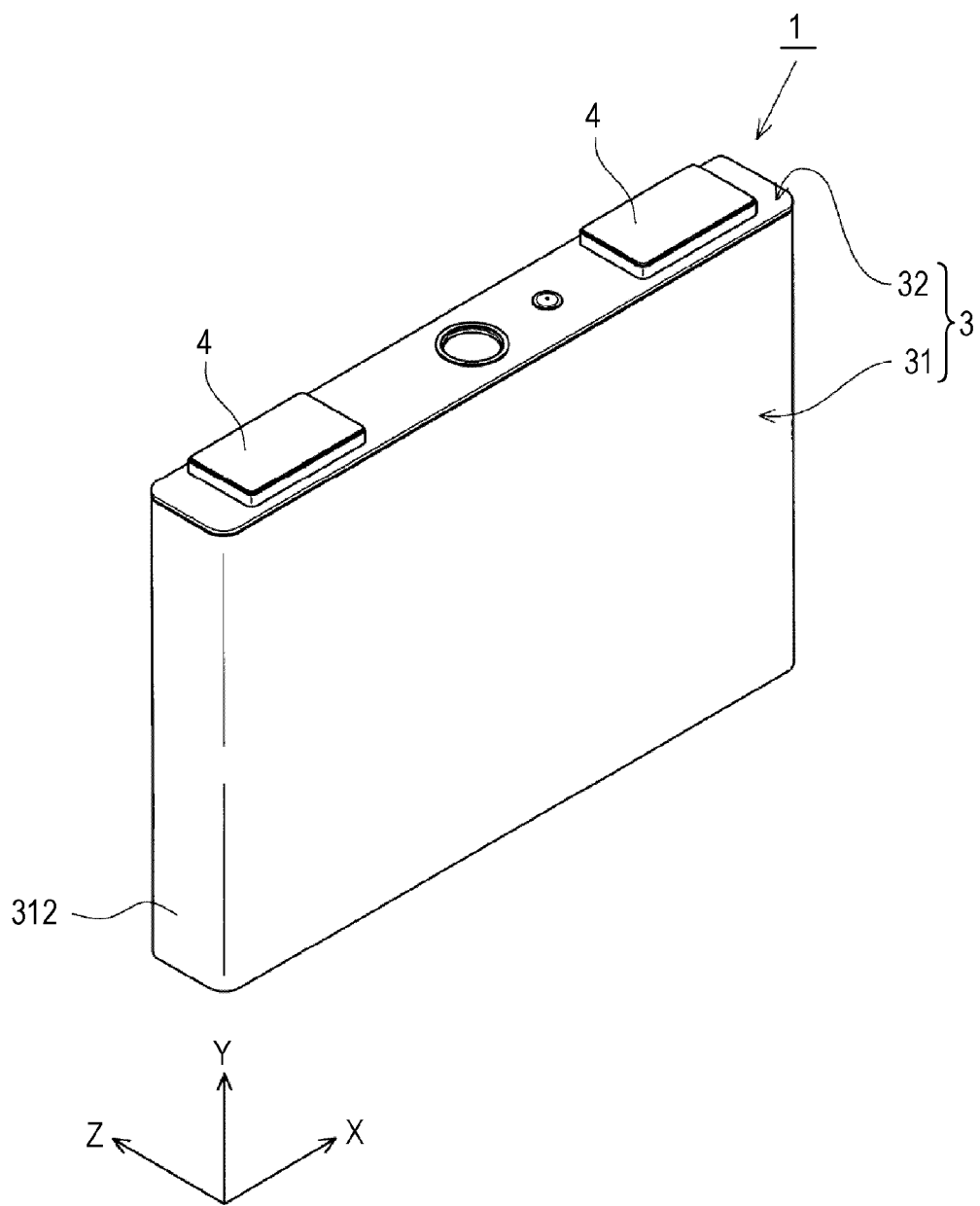
FIG. 1 is a perspective view of an energy storage device according to one embodiment of the present invention.

Inventors of the present invention have made extensive studies so as to overcome the above-mentioned drawbacks in the related art and, as a result, have found that when an elongated separator having an inorganic layer is used in an electrode assembly, there may be a case where the inorganic layer and a negative electrode face each other in an opposed manner so that a capacity retention ratio or an output retention ratio of an energy storage device equipped with such an electrode assembly is largely lowered.

It is estimated that this phenomenon occurs due to a fact that an inorganic component such as inorganic particles contained in an inorganic layer is exposed to a potential of a negative electrode so that the inorganic component reacts with lithium ion.

In view of the above, the inventors have focused on a point that a capacity retention ratio or an output retention ratio of an energy storage device is lowered when a negative electrode and an inorganic layer of a separator are made to face each other, and have invented an energy storage device having the following configuration.

An energy storage device according to an aspect of the present invention includes: an electrode assembly which includes: at least one approximately rectangular positive electrode; at least one approximately rectangular negative electrode which is stacked alternately with the positive electrode; and a strip-like elongated separator having a first base material layer and a first inorganic layer which is made to overlap with the first base material layer, wherein the elongated separator is arranged between the positive electrode and the negative electrode, and the first base material layer of the elongated separator is configured to face the negative electrode in an opposed manner between the positive electrode and the negative electrode.

With such a configuration, the base material layer (first base material layer) faces the negative electrode in an opposed manner between the positive electrode and the negative electrode, that is, the inorganic layer (first inorganic layer) and the negative electrode do not face each other in an opposed manner between the positive electrode and the negative electrode and hence, it is possible to prevent the lowering of a capacity retention ratio or an output retention ratio of the energy storage device caused by opposedly facing of the negative electrode and the inorganic layer (first inorganic layer) of the separator.

In this case, it is preferable that the first base material layer of the elongated separator be configured to face the negative electrode arranged on an end portion of the electrode assembly in a stacking direction of the positive electrode and the negative electrode from the outside in the stacking direction.

Even when the negative electrode is arranged on an outermost side in the direction that the positive electrode and the negative electrode are arranged in a row in the electrode assembly, the negative electrode and the inorganic layer (first inorganic layer) of the elongated separator do not face each other in an opposed manner and hence, it is possible to prevent the lowering of a capacity retention ratio or an output retention ratio of the energy storage device caused by opposedly facing of the negative electrode and the inorganic layer (first inorganic layer) of the separator.

The energy storage device may be configured such that the electrode assembly includes short separators having an approximately rectangular shape, the positive electrodes and the negative electrodes form a plurality of electrode groups in each of which the positive electrode and the negative electrode are alternately arranged with the short separator interposed therebetween, the plurality of electrode groups are arranged in a row in the stacking direction of the positive electrodes and the negative electrodes, the electrode groups which are arranged adjacently to each other are configured such that the positive electrode of one electrode group and the negative electrode of the other electrode group face each other in an opposed manner, the elongated separator is arranged between the electrode groups arranged adjacently to each other, and the first base material layer of the elongated separator is configured to face the negative electrode positioned at an end portion of the electrode group between the electrode groups.

With such a configuration, compared to the configuration where the elongated separator is arranged between the positive electrode and the negative electrode arranged adjacently to each other respectively, the arrangement of the elongated separator can be simplified and, at the same time, a length of the elongated separator can be suppressed as small as possible.

In this case, it is preferable that the short separator include a second base material layer and a second inorganic layer which is made to overlap with the second base material layer, and between the positive electrode and the negative electrode of each electrode group, the second base material layer of the short separator be configured to face the negative electrode in an opposed manner.

With such a configuration, also in each electrode group, the positive electrode and the base material layer (second base material layer of the short separator) face each other in an opposed manner. That is, the negative electrode and the inorganic layer (second inorganic layer of the short separator) do not face each other in an opposed manner and hence, it is possible to prevent with more certainty the lowering of a capacity retention ratio or an output retention ratio of the energy storage device caused by the oppposedly facing of the negative electrode and the inorganic layers (first and second inorganic layers).

The energy storage device may be configured such that the positive electrodes and the negative electrodes form a plurality of electrode portions which respectively include at least either one of the positive electrode and the negative electrode, the plurality of electrode portions are arranged in a row in a stacking direction of the positive electrodes and the negative electrodes, the electrode portions which are arranged adjacently to each other are configured such that the positive electrode of one electrode portion and the negative electrode of the other electrode portion face each other in an opposed manner, the plurality of electrode portions include a first electrode portion arranged at a center portion in the stacking direction, and second electrode portion which are remaining electrode portions, both ends of the first electrode portion in the stacking direction are formed of the same electrode, both ends of the second electrode portion in the stacking direction are formed of different electrodes, the elongated separator is arranged in a spiral shape such that the elongated separator surrounds the first electrode portion and passes between the respective electrode portions as viewed in a direction orthogonal to the stacking direction, and between the electrode portions, the first base material layer of the elongated separator faces the negative electrode positioned at an end of the electrode portion in the stacking direction in an opposed manner.

Also with such a configuration, the base material layer (first base material layer) faces the negative electrode in an opposed manner between the positive electrode and the negative electrode and hence, it is possible to prevent the lowering of a capacitor retention ratio or an output retention ratio of the energy storage device caused by opposedly facing of the negative electrode and the inorganic layer (first inorganic layer) of the separator.

The energy storage device may be also configured such that the positive electrodes and the negative electrodes form a plurality of electrode portions which respectively include at least either one of the positive electrode and the negative electrode, the plurality of electrode portions are arranged in a row in a stacking direction of the positive electrodes and the negative electrodes, the electrode portions which are arranged adjacently to each other are configured such that the positive electrode of one electrode portion and the negative electrode of the other electrode portion face each other in an opposed manner, both ends of each electrode portion in the stacking direction are formed of the same electrode, the elongated separator is arranged in a zigzag shape such that the elongated separator passes between the respective electrode portions as viewed in a direction orthogonal to the stacking direction, and between the electrode portions, the first base material layer of the elongated separator is configured to face the negative electrode positioned at an end of the electrode portion in the stacking direction in an opposed manner.

Also with such a configuration, the base material layer (first base material layer) faces the negative electrode between the positive electrode and the negative electrode and hence, it is possible to prevent the lowering of a capacity retention ratio or an output retention ratio of the energy storage device caused by opposedly facing of the negative electrode and the inorganic layer (first inorganic layer) of the separator.

The energy storage device may be also configured such that the elongated separator is arranged between the positive electrode and the negative electrode arranged adjacently to each other, and the first base material layer is configured to face the negative electrode in an opposed manner between the positive electrode and the negative electrode arranged adjacently to each other respectively.

With such a configuration, it is unnecessary to provide a rectangular separator used in the configuration where the elongated separator is arranged between a plurality of electrode groups and hence, the number of kinds of separators can be reduced.

As described above, according to the present invention, it is possible to provide an energy storage device equipped with an electrode assembly which includes an elongated separator having an inorganic layer and minimizes lowering of a capacity retention ratio or an output retention ratio.

Hereinafter, one embodiment of an energy storage device according to the present invention is described with reference to FIG. 1 to FIG. 6. As the energy storage device, a primary battery, a secondary battery, a capacitor and the like are named. In this embodiment, as one example of the energy storage device, a chargeable and dischargeable secondary battery is described. Names of respective constitutional members (respective constitutional elements) of this embodiment are used only for this embodiment, and may differ from names of respective constitutional members (respective constitutional elements) in BACKGROUND.

The energy storage device of this embodiment is a non-aqueous electrolyte secondary battery. To be more specific, the energy storage device is a lithium ion secondary battery which makes use of the electron transfer brought about by the movement of lithium ion. Such a kind of energy storage device supplies electric energy. The energy storage device is used in a single form or in a plural form. To be more specific, when required output and required voltage are small, the energy storage device is used in a single form. On the other hand, when at least one of required output and required voltage is large, the energy storage device is used for an energy storage apparatus in combination with another energy storage device. In the energy storage apparatus, the energy storage devices used in the energy storage apparatus supply electric energy.

Figure 2:
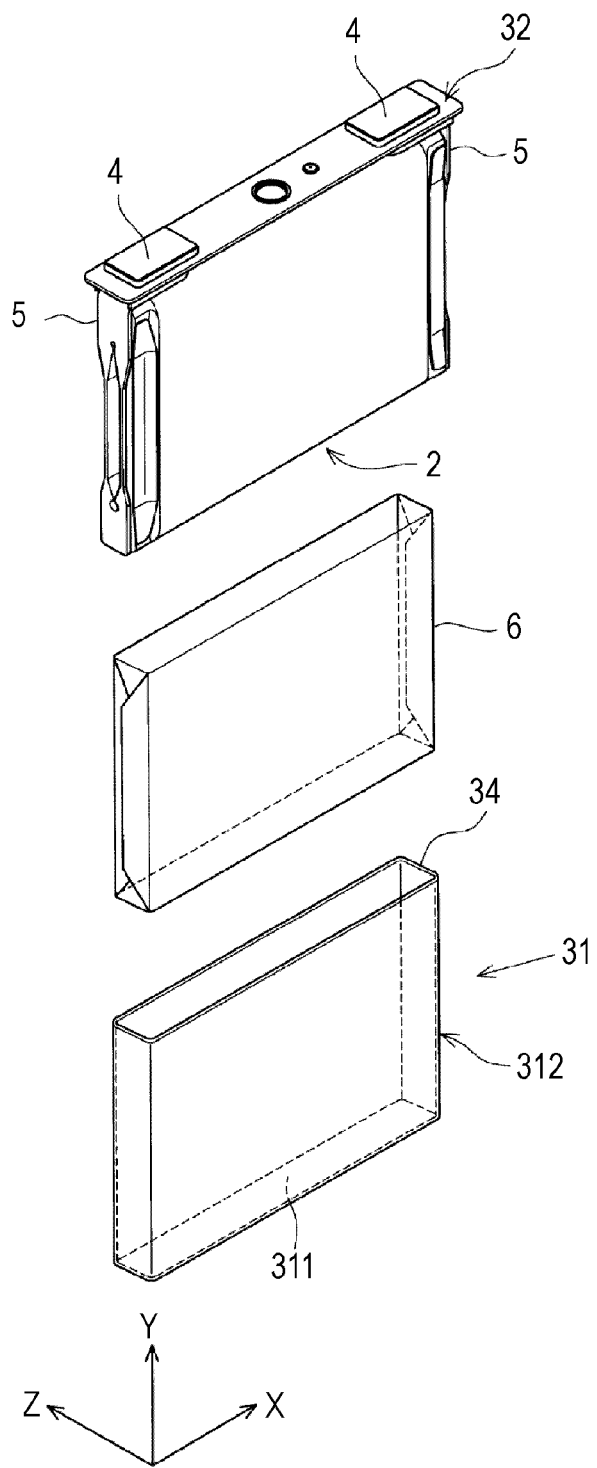
FIG. 2 is an exploded perspective view of the energy storage device.
Figure 3:
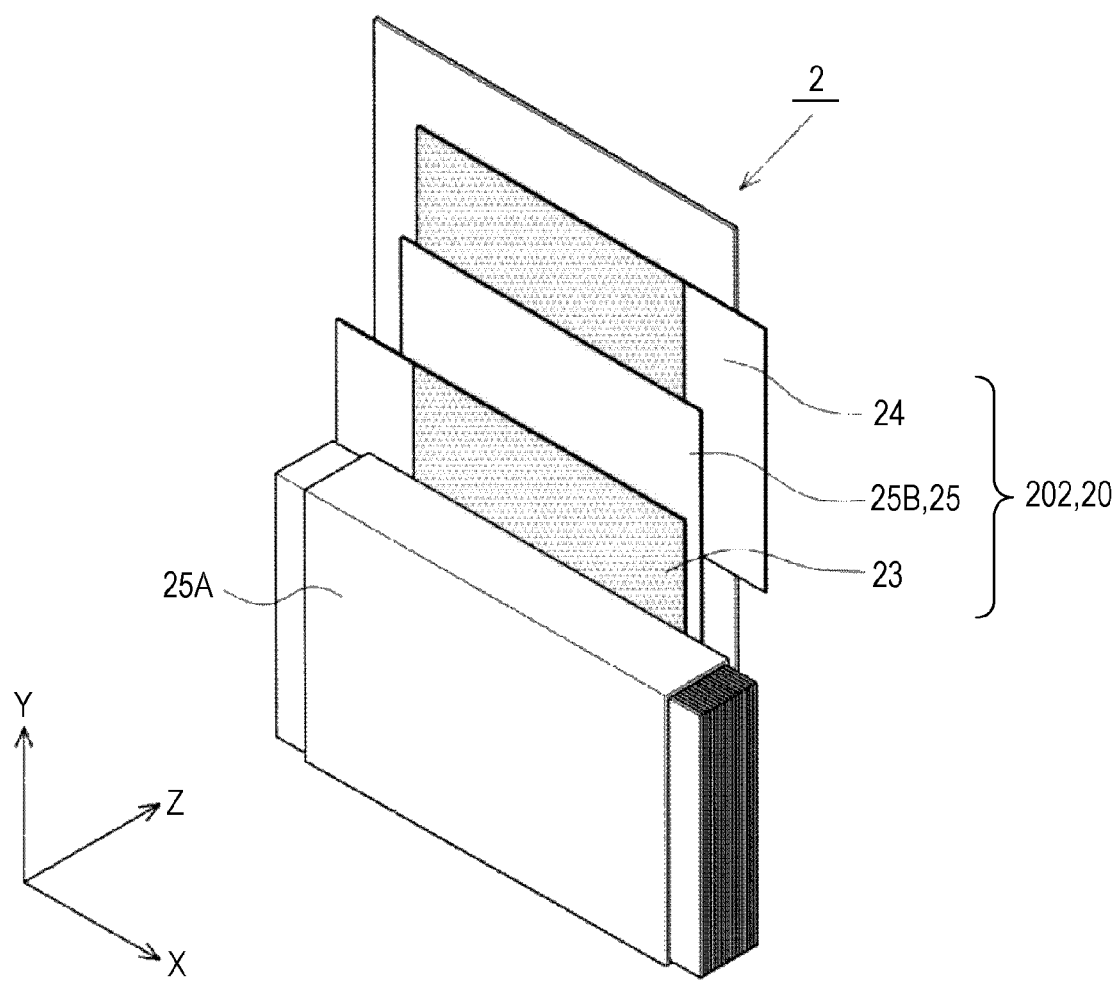
FIG. 3 is a schematic view describing a configuration of an electrode assembly of the energy storage device.

As shown in FIG. 1 to FIG. 3, the energy storage device is equipped with an electrode assembly 2 which includes positive electrodes 23 and negative electrodes 24. The electrode assembly 2 is of a so-called stacked-type where the rectangular positive electrodes 23 and the rectangular negative electrodes 24 are stacked to each other. To be more specific, an energy storage device 1 includes the electrode assembly 2, a case 3 which houses the electrode assembly 2 therein, and external terminals 4 which are arranged outside the case 3 and are electrically conductive with the electrode assembly 2. Further, the energy storage device 1 also includes current collectors 5 which make the electrode assembly 2 and the external terminals 4 conductive with each other and the like besides the electrode assembly 2, the case 3, and the external terminals 4.

The electrode assembly 2 includes at least one rectangular positive electrode 23, at least one rectangular negative electrode 24 which is arranged substantially parallel to and alternately with the positive electrode 23, and a separator 25 which insulates the positive electrode 23 and the negative electrode 24 from each other. That is, in the electrode assembly 2, the positive electrode 23 and the negative electrode 24 are arranged alternately, and the separator 25 is arranged such that each separator 25 is interposed between the positive electrode 23 and the negative electrode 24. The electrode assembly 2 of this embodiment includes the plurality of positive electrodes 23, the plurality of negative electrodes 24, and the plurality of separators 25.

Figure 4:
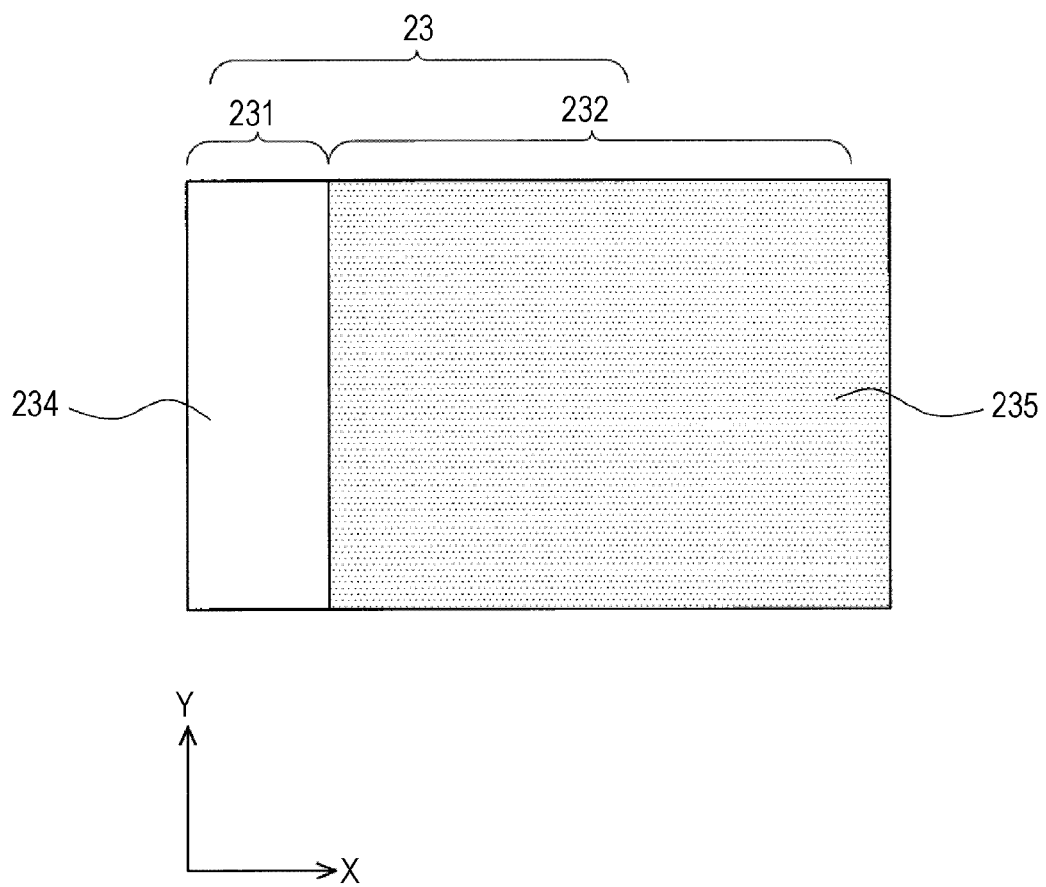
FIG. 4 is a front view of a positive electrode which constitutes the electrode assembly.

As shown also in FIG. 4, the positive electrode 23 has a metal foil (positive base material layer) 234 and positive active material layers 235 which are made to overlap with the metal foil 234. The positive electrode 23 in this embodiment has the pair of positive active material layers 235 which is made to overlap with both surfaces of the metal foil 234. The metal foil 234 has a rectangular shape. The metal foil 234 in this embodiment is an aluminum foil, for example. The positive electrode 23 has a non-coated portion 231 which is not coated by the positive active material layer 235 (a portion on which the positive active material layer 235 is not formed) at one edge portion thereof in a longitudinal direction of the rectangular shape. In the positive electrode 23, a portion where the positive active material layer 235 is formed is referred to as a coated portion 232. In the description made hereinafter, assume the longitudinal direction of the positive electrode 23 as an X axis direction in a coordinate system where three axes are orthogonal to each other at a right angle respectively, assume a lateral direction of the positive electrode 23 as a Y axis direction in the coordinate system where three axes are orthogonal to each other at a right angle respectively, and assume a thickness direction of the positive electrode 23 as a Z axis direction in the coordinate system where three axes are orthogonal to each other at a right angle respectively.

The positive active material layer 235 contains a positive active material and a binder.

The positive active material is a lithium metal oxide, for example. To be more specific, for example, the positive active material is a composite oxide ($Li_aCo_yO_2$, $Li_aNi_xO_2$, $Li_aMn_zO_4$, $Li_aNi_xCo_yMn_zO_2$ or the like) expressed by $Li_aMe_bO_c$ (Me expressing one, two or more transition metals) or a polyanion compound ($Li_aFe_bPO_4$, $Li_aMn_bPO_4$, $Li_aMn_bSiO_4$, $Li_aCo_bPO_4F$ or the like) expressed by $Li_aMe_b(XO_c)_d$ (Me expressing one, two or more transition metals, and X expressing P, Si, B, V, for example). The positive active material in this embodiment is $LiNi_{1/3}Co_{1/3}Mn_{1/3}O_2$.

The binder used for forming the positive active material layer 235 is made of polyvinylidene fluoride (PVdF), a copolymer of ethylene and vinyl alcohol, polymethyl methacrylate, polyethylene oxide, polypropylene oxide, polyvinyl alcohol, polyacrylate, polymethacrylate, or styrene-butadiene rubber (SBR), for example. The binder of this embodiment is made of polyvinylidene fluoride.

The positive active material layer 235 may further contain a conductive auxiliary agent such as Ketjenblack (registered trademark), acetylene black or graphite. The positive active material layer 235 in this embodiment contains acetylene black as the conductive auxiliary agent.

Figure 5:
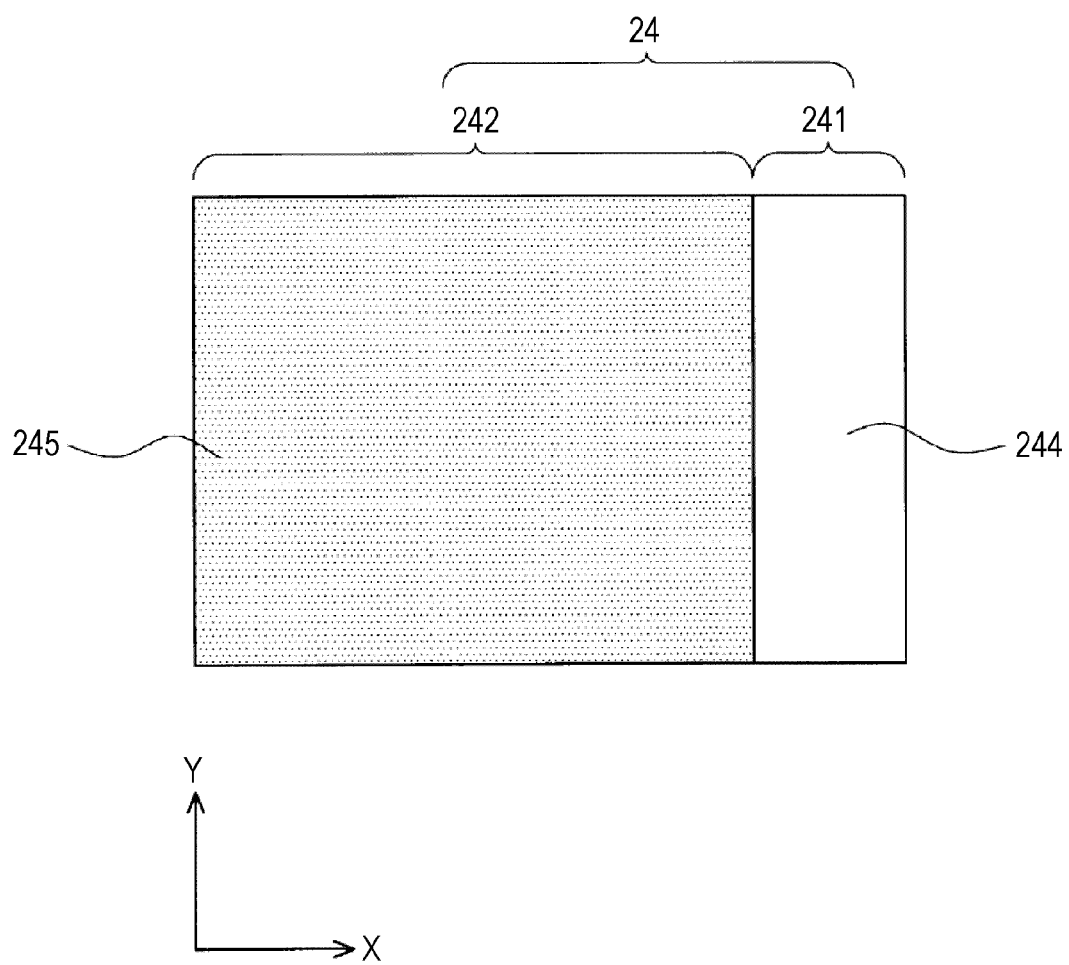
FIG. 5 is a front view of a negative electrode which constitutes the electrode assembly.

As shown also in FIG. 5, the negative electrode 24 has a metal foil (negative base material layer) 244, and negative active material layers 245 which are made to overlap with the metal foil 244. The negative electrode 24 of this embodiment has the pair of negative active material layers 245 which is made to overlap with both surfaces of the metal foil 244. The metal foil 244 has a rectangular shape. The metal foil 244 in this embodiment is a copper foil, for example. The negative electrode 24 has a non-coated portion 241 which is not coated by the negative active material layer 245 (a portion on which the negative active material layer 245 is not formed) at the other edge portion (on a side opposite to the non-coated portion 231 of the positive electrode 23) in a longitudinal direction (X axis direction) of the rectangular shape. A width (a size in the X axis direction) of the coated portion 242 (a portion on which the negative active material layer 245 is formed) of the negative electrode 24 is slightly larger than a width of the coated portion 232 of the positive electrode 23.

The negative active material layer 245 contains a negative active material and a binder.

The negative active material is, for example, a carbon material such as graphite, hardly graphitizable carbon, easily graphitizable carbon or the like or a material such as silicon (Si) or tin (Sn) which generates an alloying reaction with lithium ion. The negative active material in this embodiment is hardly graphitizable carbon.

The binder used for forming the negative active material layer 245 is substantially equal to the binder used for forming the positive active material layer 235. The binder of this embodiment is made of polyvinylidene fluoride.

The negative active material layer 245 may further contain a conductive auxiliary agent such as Ketjenblack (registered trademark), acetylene black or graphite. The negative active material layer 245 in this embodiment does not contain a conductive auxiliary agent.

Figure 6:
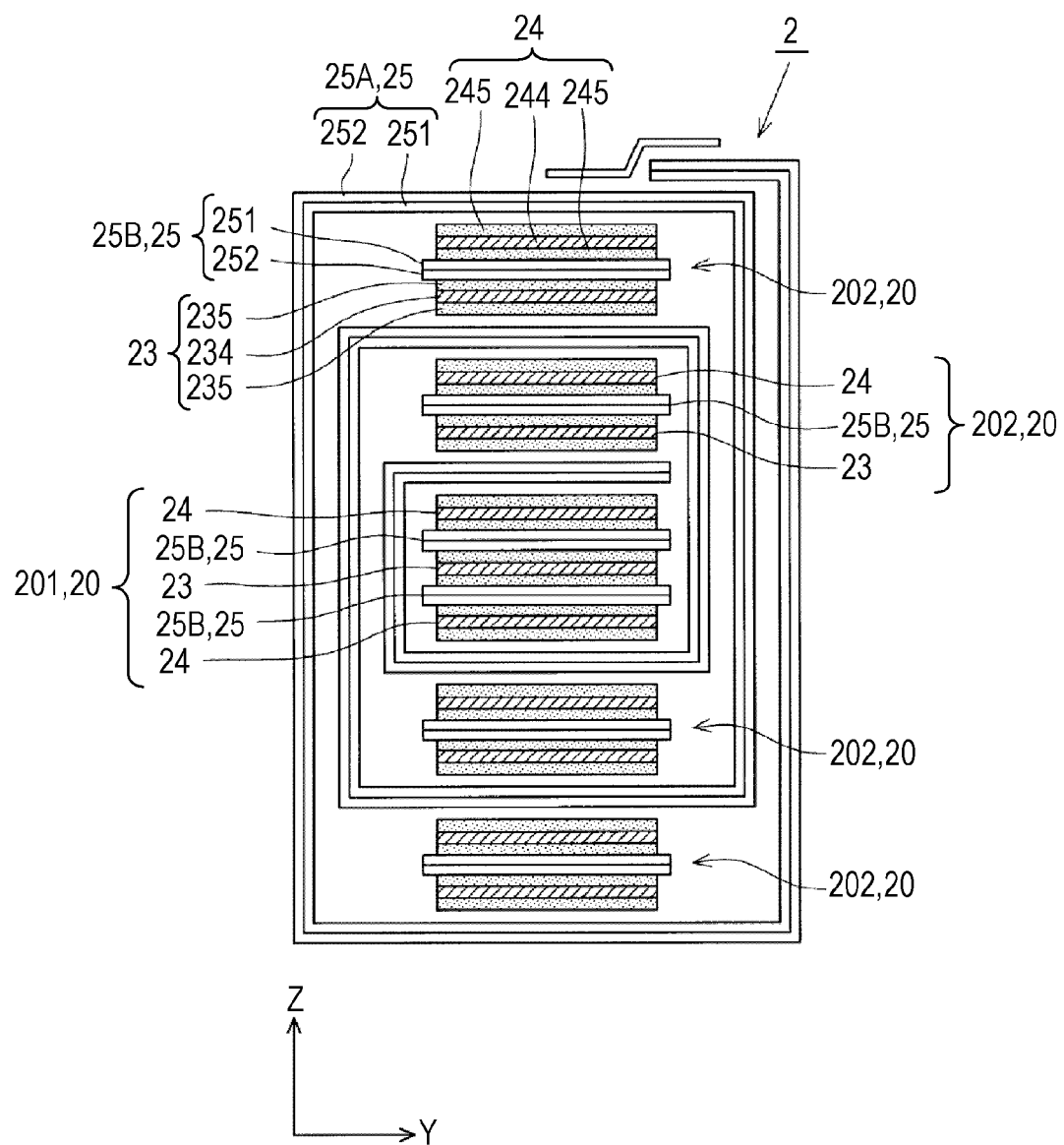
FIG. 6 is a schematic view of the electrode assembly.

The separators 25 are members having insulating property. As shown in FIG. 3 and FIG. 6, the separator 25 is arranged between the positive electrode 23 and the negative electrode 24. With such a configuration, in the electrode assembly 2, the positive electrode 23 and the negative electrode 24 are insulated from each other. The separators 25 retain an electrolyte solution in the inside of the case 3. With such a configuration, at the time of performing charging or discharging of the energy storage device 1, lithium ions move between the positive electrode 23 and the negative electrode 24 which are alternately stacked to each other with the separator 25 interposed therebetween.

The separator 25 has a separator base material layer (base material layer) 251, and inorganic layers 252 which are made to overlap with the separator base material layer 251. The separator base material layer 251 is made of a polyolefin resin such as polyethylene or polypropylene, cellulose or polyamide, and the inorganic layer 252 is made of a mixture of an inorganic component such as inorganic particles and the binder or the like. As the inorganic particles, silica ($SiO_2$), alumina ($Al_2O_3$), aluminum silicate ($SiO_2$—$Al_2O_3$) or the like can be used. As the binder, polyacrylonitrile, polyvinylidene fluoride, polyacrylate, polymethacrylate, styrene-butadiene rubber or the like can be used. The separator base material layer 251 in this embodiment is made of polyethylene, and the inorganic layer 252 contains silica and alumina as inorganic particles and polyacrylate as a binder.

The separator 25 in this embodiment includes a strip-shaped elongated separator 25A, and rectangular short separators 25B. The elongated separator 25A has a strip shape having a width corresponding to widths of the coated portions 232, 242 of the positive electrode 23 and the negative electrode 24 (sizes of the positive electrode 23 and the negative electrode 24 in the X axis direction). The short separator 25B has a rectangular shape having a size corresponding to sizes of the coated portions 232, 242 of the positive electrode 23 and the negative electrode 24 (respective sizes of the positive electrode 23 and the negative electrode 24 in the X axis direction and in the Y axis direction).

In the electrode assembly 2 in this embodiment, the above-mentioned positive electrodes 23, negative electrodes 24, and short separators 25B form a plurality of electrode groups 20. That is, the electrode assembly 2 in this embodiment includes the plurality of electrode groups 20 each of which includes the positive electrodes 23 and the negative electrodes 24.

The electrode group 20 is configured such that the positive electrode 23 and the negative electrode 24 are arranged alternately with the short separator 25 interposed therebetween. To be more specific, the positive electrode 23 and the negative electrode 24 are made to overlap with each other with the short separator 25B interposed therebetween in a state where the positive electrode 23 and the negative electrode 24 are displaced from each other in the X axis direction such that the coated portions 232, 242 overlap with each other with the non-coated portions 231, 241 positioned opposite to each other. In such a state, the non-coated portion 231 of the positive electrode 23 and the non-coated portion 241 of the negative electrode 24 do not overlap with each other. That is, the non-coated portion 231 of the positive electrode 23 projects toward one side in the X axis direction from a region where the positive electrode 23 and the negative electrode 24 overlap with each other, and the non-coated portion 241 of the negative electrode 24 projects toward the other side in the X axis direction (in the direction opposite to the projecting direction of the non-coated portion 231 of the positive electrode 23) from the region where the positive electrode 23 and the negative electrode 24 overlap with each other. In this manner, the electrode group 20 includes a portion where the coated portion 232 of the positive electrode 23 and the coated portion 242 of the negative electrode 24 overlap with each other, a portion (a non-coated portion stacked portion) 26A where the non-coated portions 231 of the positive electrodes 23 overlap with each other, and a portion (non-coated portion stacked portion) 26B where the non-coated portions 241 of the negative electrodes 24 overlap with each other. These non-coated portion stacked portions 26A, 26B are portions which are made conductive with the current collectors 5 in the electrode assembly 2. In this embodiment, in each electrode group 20, the short separator 25B is arranged such that the separator base material layer 251 faces the negative electrode 24 in an opposed manner.

In the electrode assembly 2, the plurality of electrode groups 20 are arranged such that, between two electrode groups 20 arranged adjacently to each other, the positive electrode 23 of one neighboring electrode group 20 and the negative electrode 24 of the other neighboring electrode group 20 face each other in an opposed manner. With such a configuration, the positive electrode 23 and the negative electrode 24 are arranged alternately in the entire electrode assembly 2.

The detail configuration of the electrode assembly 2 is described hereinafter. The electrode assembly 2 in this embodiment has the odd number of electrode groups 20. The electrode assembly 2 includes two kinds of electrode groups (first electrode group 201 and second electrode group 202). To be more specific, the electrode assembly 2 includes one first electrode group 201 and a plurality of second electrode groups 202. In the first electrode group 201, one positive electrode 23 and two negative electrodes 24 are arranged alternately with one short separator 25B interposed between the positive electrode 23 and one negative electrode 24 and the other short separator 25B interposed between the positive electrode 23 and the other negative electrode 24. In the second electrode group 202, one positive electrode 23 and one negative electrode 24 are arranged with the short separator 25B interposed therebetween. In the electrode assembly 2, the first electrode group 201 is arranged at a center position in the Z axis direction, and the second electrode groups 202 are arranged on both sides of the first electrode group 201. In the entire electrode assembly 2 having such a configuration, the positive electrode 23 and the negative electrode 24 are arranged alternately in the Z axis direction as described above.

For the electrode groups 20 arranged (arranged in a row) as described above, the elongated separator 25A is arranged such that the separator base material layer (first base material layer) 251 faces the negative electrode 24 in an opposed manner between the positive electrode 23 and negative electrode 24. In other words, the elongated separator 25A is arranged such that the inorganic layer (first inorganic layer) 252 faces the positive electrode 23 in an opposed manner between the positive electrode 23 and negative electrode 24. Further, the elongated separator 25A is arranged such that the separator base material layer 251 faces the negative electrodes 24 which are respectively arranged on end portions of the electrode assembly 2 (a row of the electrode groups 20) in the Z axis direction from the outside in the Z axis direction.

To be more specific, the elongated separator 25A is arranged between the respective electrode groups 20 and, at the same time, is arranged such that, between the electrode groups 20, the separator base material layer 251 faces the negative electrodes 24 positioned at the end portions (the end portions in the Z axis direction) of the electrode groups 20.

To be more specific, the elongated separator 25A is arranged in a spiral shape as viewed in the X axis direction such that the elongated separator 25A surrounds the first electrode group 201 positioned at the center in a row of the plurality of electrode groups 20 along the Y-Z plane (a plane including the Y axis and the Z axis) and, subsequently, surrounds the second electrode groups 202 in order from the second electrode group 202 closer to the first electrode group 201. An outer end portion of the elongated separator 25A is fixed by a tape or the like. FIG. 3 schematically shows the arrangement of the elongated separator 25A. Further, for the sake of convenience of description, FIG. 6 shows five electrode groups 20. However, in an actual energy storage device 1, for example, twenty one electrode groups 20 in total consisting of one first electrode group 201 and twenty second electrode groups 202 are arranged.

Returning to FIG. 1 and FIG. 2, the case 3 includes: a case body 31 having an opening; and a lid plate 32 which closes the opening of the case body 31. The case 3 stores an electrolyte solution in an inner space 33 together with the electrode assembly 2, the current collector 5 and the like. The case 3 is made of metal having resistance to the electrolyte solution.

The electrolyte solution is a nonaqueous solution based electrolyte solution. The electrolyte solution can be formed by dissolving an electrolyte salt into an organic solvent. The organic solvent is, for example, a cyclic carbonate ester group such as propylene carbonate or ethylene carbonate, or a chain carbonate group such as dimethyl carbonate, diethyl carbonate or ethyl methyl carbonate. The electrolyte salt is $LiClO_4$, $LiBF_4$, $LiPF_6$ or the like. The electrolyte solution in this embodiment is a solution formed by dissolving 1 mol/L of $LiPF_6$ into a mixed solvent prepared by mixing propylene carbonate, dimethyl carbonate, and ethyl methyl carbonate at a ratio of 3:2:5.

The case 3 is formed by joining an opening peripheral edge portion 34 of the case body 31 and a peripheral edge portion of the lid plate 32 to each other in a state where the opening peripheral edge portion 34 and the peripheral edge portion of the lid plate 32 are made to overlap with each other. The case 3 has an inner space 33 defined by the case body 31 and the lid plate 32.

The case body 31 includes a plate-like closing portion 311, and a cylindrical barrel portion 312 which is connected to a peripheral edge of the closing portion 311. The closing portion 311 is a portion positioned at a lower end of the case body 31 in a posture where the case body 31 is arranged such that the opening faces upward. That is, the closing portion 311 is a portion which forms a bottom wall of the case body 31 in a posture where the opening faces upward. The closing portion 311 has a rectangular shape as viewed in a normal direction of the closing portion 311. The barrel portion 312 in this embodiment has a prismatic cylindrical shape. To be more specific, the barrel portion 312 has a flat prismatic cylindrical shape. As described above, the case body 31 has a prismatic cylindrical shape where one end portion in the opening direction (Z axis direction) is closed (that is, a bottomed prismatic cylindrical shape).

The lid plate 32 is a plate-like member which closes the opening of the case body 31. To be more specific, the lid plate 32 is formed such that the peripheral edge portion of the lid plate 32 is made to overlap with the opening peripheral edge portion 34 of the case body 31 so as to close the opening. In this manner, the lid plate 32 and the case body 31 are welded to each other at a boundary portion in a state where the opening peripheral edge portion 34 and the lid plate 32 are made to overlap with each other thus forming the case 3.

The external terminals 4 are portions electrically connected to external terminals of another energy storage device, external equipment or the like. The external terminals 4 are made of a material having conductivity. For example, the external terminals 4 are made of a metal material having high weldability such as an aluminum-based metal material such as aluminum or an aluminum alloy, or a copper-based metal material such as copper or a copper alloy.

The current collectors 5 are arranged in the inside of the case 3, and are directly or indirectly connected with the electrode assembly 2 in a conductive manner. The current collectors 5 are made of a material having conductivity, and are arranged along an inner surface of the case 3. The current collectors 5 are arranged on a positive pole and a negative pole of the energy storage device 1 respectively. In the energy storage device 1 of this embodiment, the current collector 5 for the positive electrode is connected to the non-coated portion stacked portion 26A of the positive electrode of the electrode assembly 2 in the inside of the case 3, and the current collector 5 for the negative electrode is connected to the non-coated portion stacked portion 26B of the negative electrode of the electrode assembly 2 in the inside of the case 3.

The current collector 5 for the positive electrode and the current collector 5 for the negative electrode are made of different materials. To be more specific, the current collector 5 for the positive electrode is made of aluminum or an aluminum alloy, for example, and the current collector 5 for the negative electrode is made of copper or a copper alloy, for example.

The energy storage device 1 includes an insulating member 6 which insulates the electrode assembly 2 and the case 3 from each other and the like. The insulating member 6 in this embodiment is an insulating cover, for example. The insulating cover 6 is arranged between the case 3 (to be more specific, the case body 31) and the electrode assembly 2. The insulating cover 6 is made of a material having insulating property. The insulating cover 6 in this embodiment is made of a resin such as polypropylene or polyphenylenesulfide, for example.

In the energy storage device 1 of this embodiment, the electrode assembly 2 (to be more specific, the electrode assembly 2 and the current collector 5) which is in a state of being stored in the bag-shaped insulating cover 6 is stored in the inside of the case 3.

According to the above-mentioned energy storage device 1, the separator base material layer 251 faces the negative electrode 24 in an opposed manner between the positive electrode 23 and the negative electrode 24. That is, the inorganic layer 252 and the negative electrode 24 do not face each other in an opposed manner between the positive electrode 23 and the negative electrode 24. Accordingly, it is possible to prevent lowering of a capacity retention ratio or lowering of an output retention ratio of the energy storage device 1 caused by arranging the negative electrode 24 and the inorganic layer 252 of the separator 25 in an oppositely facing manner.

In the energy storage device 1 of this embodiment, the elongated separator 25A is arranged such that the separator base material layer 251 faces the negative electrodes 24 arranged on end portions in the Z axis direction in an opposed manner from the outside in the Z axis direction. With such a configuration, even when the negative electrode 24 is arranged on an outermost side of the electrode assembly 2 in the Z axis direction (in a direction along which the positive electrode 23 and the negative electrode 24 are arranged), the negative electrode 24 and the inorganic layer 252 of the separator 25 do not face each other in an opposed manner and hence, it is possible to more surely prevent lowering of a capacity retention ratio or lowering of an output retention ratio of the energy storage device 1 caused by arranging the negative electrode 24 and the inorganic layer 252 of the separator 25 in an opposed manner.

In the energy storage device 1 of this embodiment, the elongated separator 25A is arranged between the electrode groups 20 arranged adjacently to each other in the electrode assembly 2, and the short separator 25B is arranged between the positive electrode 23 and the negative electrode 24 in each electrode group 20. Accordingly, compared to a configuration where the elongated separator 25A is arranged between the positive electrode 23 and the negative electrode 24 arranged adjacently to each other (see FIG. 8), an arrangement of the elongated separator 25A can be simplified and, at the same time, a length of the elongated separator 25A can be suppressed as short as possible.

Further, in the energy storage device 1 of this embodiment, the short separator 25B has the separator base material layer (second base material layer) 251, and the inorganic layer (second inorganic layer) 252 which is made to overlap with the separator base material layer 251. The short separator 25B is arranged such that the separator base material layer 251 faces the negative electrode 24 in an opposed manner between the positive electrode 23 and the negative electrode 24 in each electrode group 20.

With such a configuration, also in each electrode group 20, the positive electrode 23 and the separator base material layer 251 face each other in an opposed manner. That is, the negative electrode 24 and the inorganic layer 252 do not face each other in an opposed manner and hence, it is possible to more surely prevent lowering of a capacity retention ratio or lowering of an output retention ratio of the energy storage device 1 caused by arranging the negative electrode 24 and the inorganic layer 252 in an opposed manner.

It is needless to say that the energy storage device of the present invention is not limited to the above-mentioned embodiment, and various modifications are conceivable without departing from the gist of the present invention. For example, to a configuration of one embodiment, a configuration of another embodiment may be added. Further, a part of a configuration of one embodiment may be replaced with a configuration of another embodiment. Still further, a part of a configuration of one embodiment may be eliminated.

Figure 7:
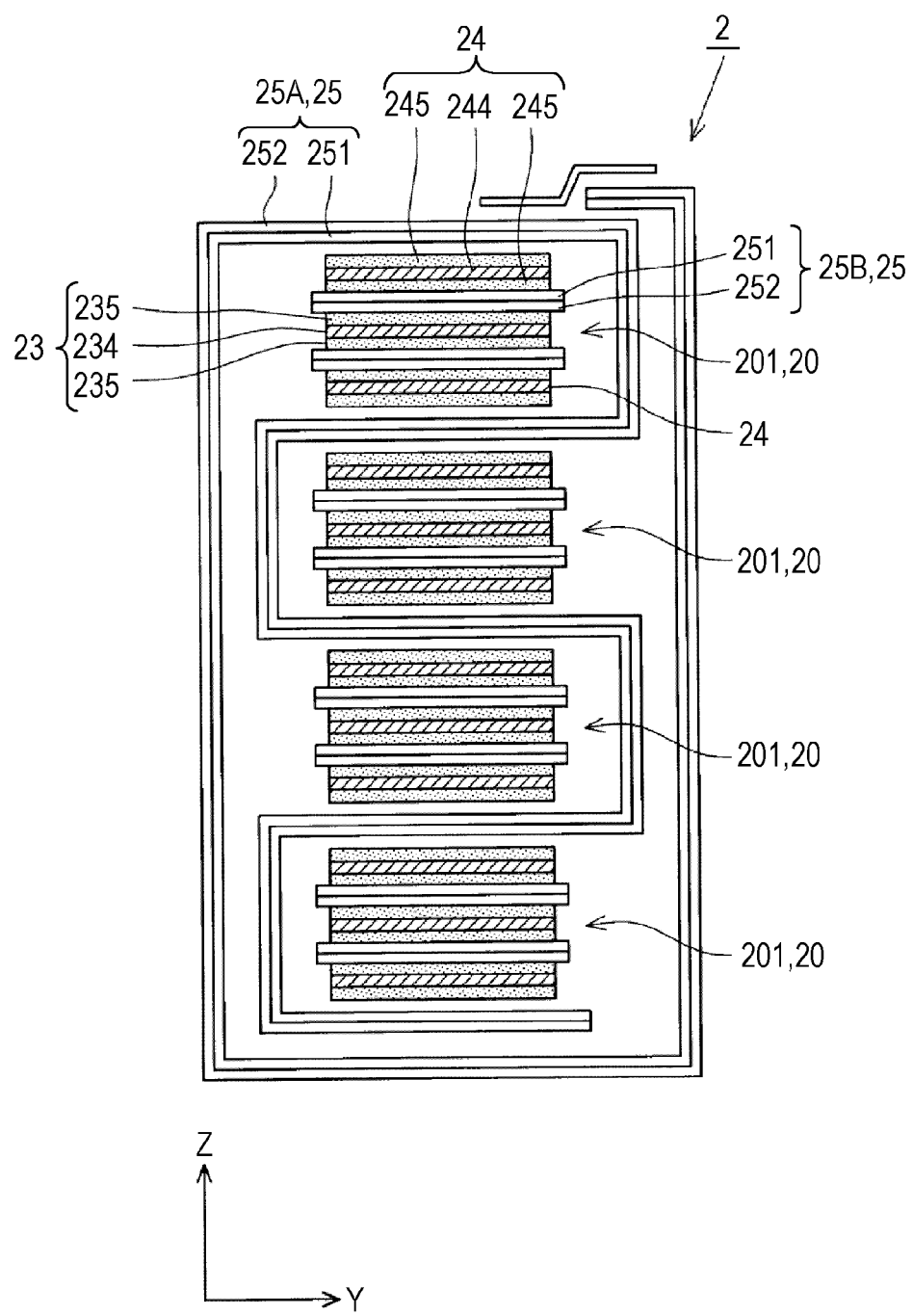
FIG. 7 is a schematic view of an electrode assembly according to another embodiment.

The specific arrangement of the elongated separator 25A is not limited. For example, although the elongated separator 25A is arranged in a spiral shape as viewed in the X axis direction in the electrode assembly 2 of the above-mentioned embodiment, as shown in FIG. 7, the elongated separator 25A may be arranged in a zigzag shape so as to pass between the respective electrode groups 20 as viewed in the X axis direction. Further, the electrode which is positioned on an outermost side of the electrode assembly 2 in the Z axis direction may be the positive electrode 23 or the negative electrode 24. When the electrode which is positioned on the outermost side of the electrode assembly 2 in the Z axis direction is the positive electrode 23, the elongated separator 25A may not be arranged at a position facing the positive electrode 23. That is, in the electrode assembly 2, it is sufficient that the separators 25A, 25B are arranged such that the separator base material layer 251 is arranged at a position facing the negative electrode 24 in an opposed manner.

In the energy storage device 1 of this embodiment, the separators 25A, 25B are arranged such that all negative electrodes 24 face the separator base material layer 251 in an opposed manner. However, the present invention is not limited to such a configuration. In the energy storage device 1, it is sufficient that the separators 25A, 25B are arranged such that at least one negative electrode 24 faces the separator base material layer 251 in an opposed manner. Compared to the energy storage device where all negative electrodes 24 face the inorganic layer 252 of the separator 25 in an opposed manner, such an energy storage device 1 can prevent lowering of a capacity retention ratio or lowering of an output retention ratio of the energy storage device 1 caused by arranging the negative electrode 24 and the inorganic layers 252 of the separators 25A, 25B in an oppositely facing manner.

In the plurality of electrode groups 20 which form the electrode assembly 2, the specific numbers of positive electrodes 23 and the negative electrodes 24 which form each electrode group 20 are not limited. For example, the first electrode group 201 may include one or three or more positive electrodes 23 and two or more negative electrodes 24, and the second electrode group 202 may include two or more positive electrodes 23 and two or more negative electrodes 24. Further, the number of electrodes (positive electrodes 23 and negative electrodes 24) may differ for every electrode group 20. Also in these cases, the number of positive electrodes 23, the number of negative electrodes 24, and arrangement of the positive electrodes 23 and the negative electrodes 24 in the respective electrode groups 20 are set such that the positive electrodes 23 and the negative electrodes 24 are alternately arranged in the entire electrode assembly 2.

Figure 8:
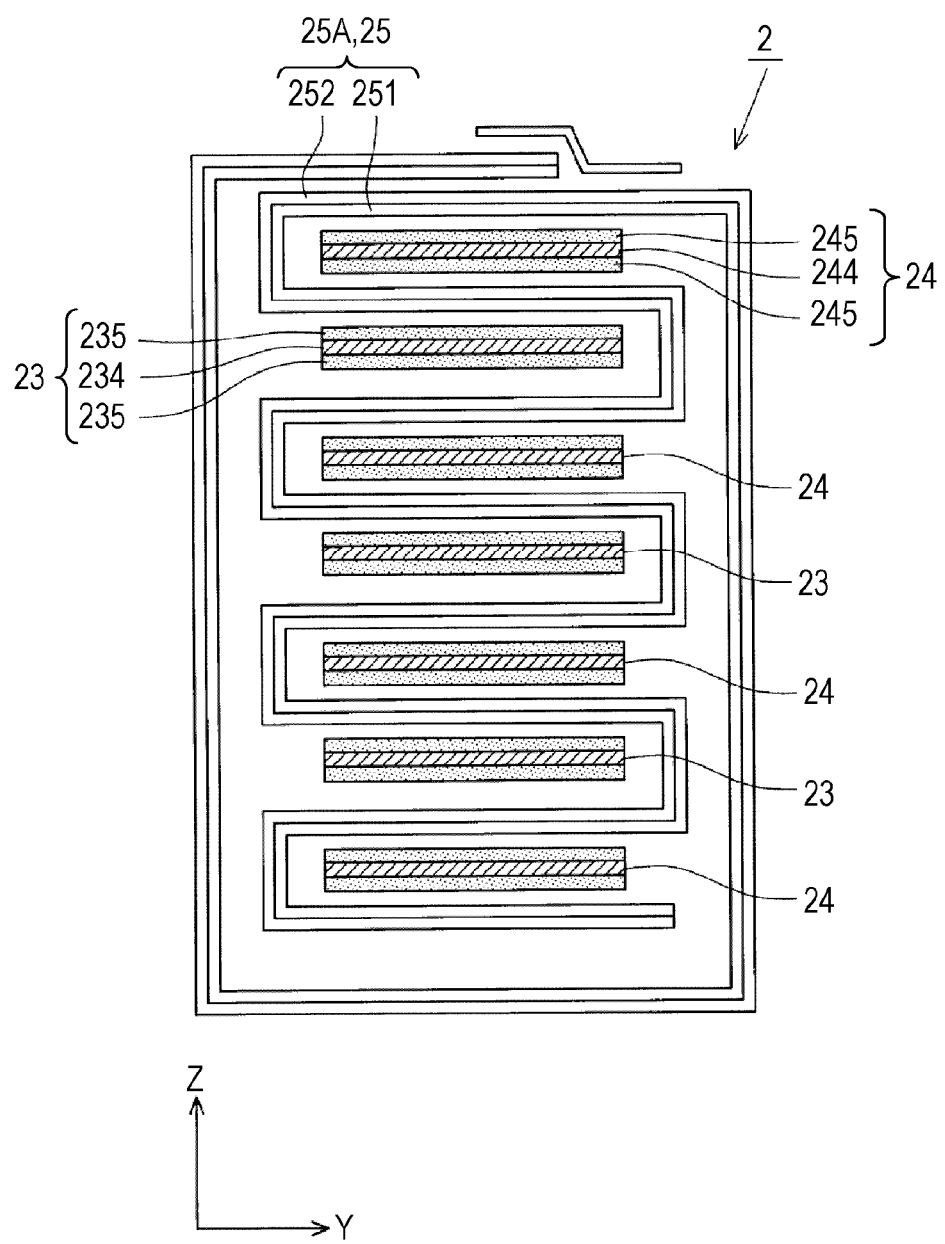
FIG. 8 is a schematic view of an electrode assembly according to still another embodiment.

Although the electrode assembly 2 of this embodiment forms the plurality of electrode groups 20, the present invention is not limited to such a configuration. For example, the electrode assembly 2 forms one electrode group 20. Alternatively, the electrode assembly 2 may form no electrode group as shown in FIG. 8. In the case where the electrode assembly 2 form no electrode group, it is preferable that the elongated separator 25A be arranged between the positive electrode 23 and the negative electrode 24 arranged adjacently to each other respectively and, at the same time, be arranged such that the separator base material layer 251 faces the negative electrode in an opposed manner between the positive electrode 23 and the negative electrode 24 arranged adjacently to each other respectively. With such a configuration, unlike the energy storage device 1 where the elongated separator 25A is arranged between the plurality of electrode groups 20, it is unnecessary to provide the rectangular short separators 25B and hence, it is possible to reduce kinds of separator 25 (that is, the number of parts which form the energy storage device 1).

Figure 9:
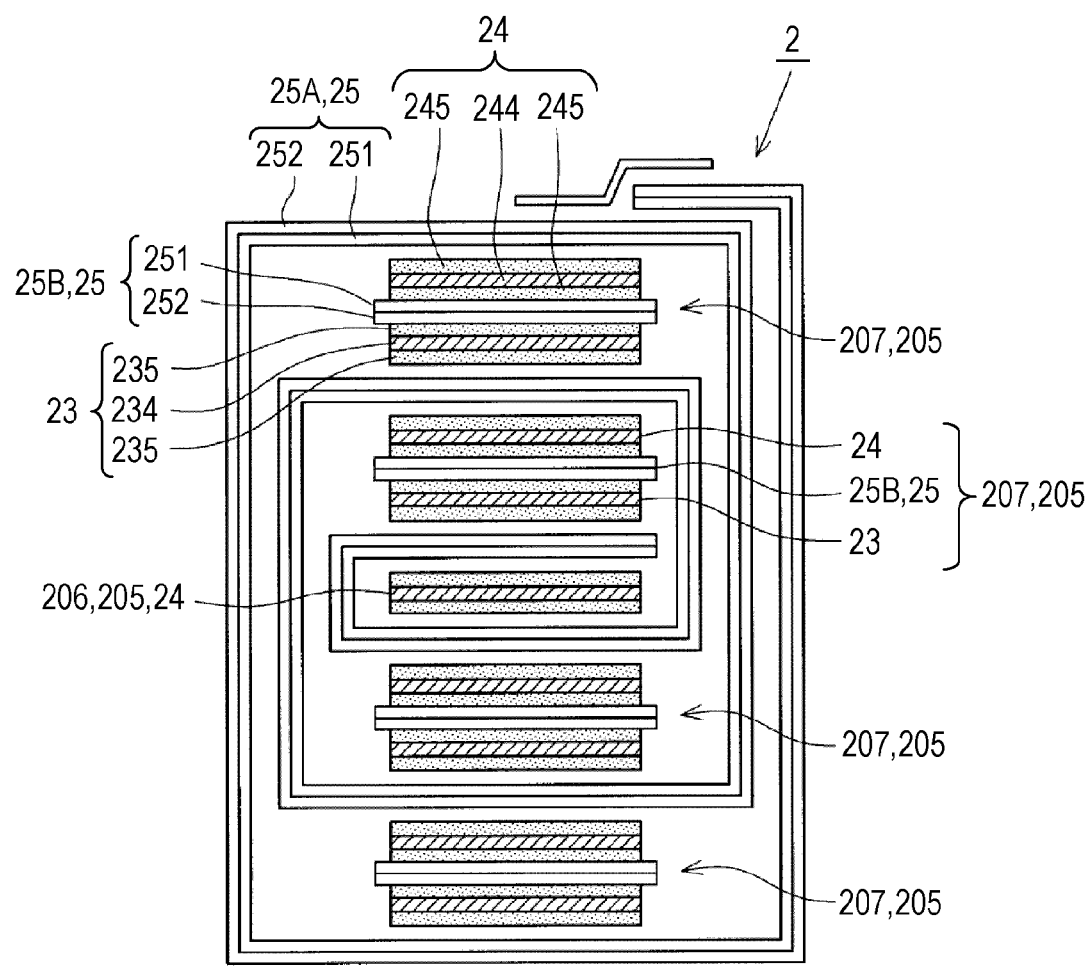
FIG. 9 is a schematic view of an electrode assembly according to still another embodiment.
Figure 10:
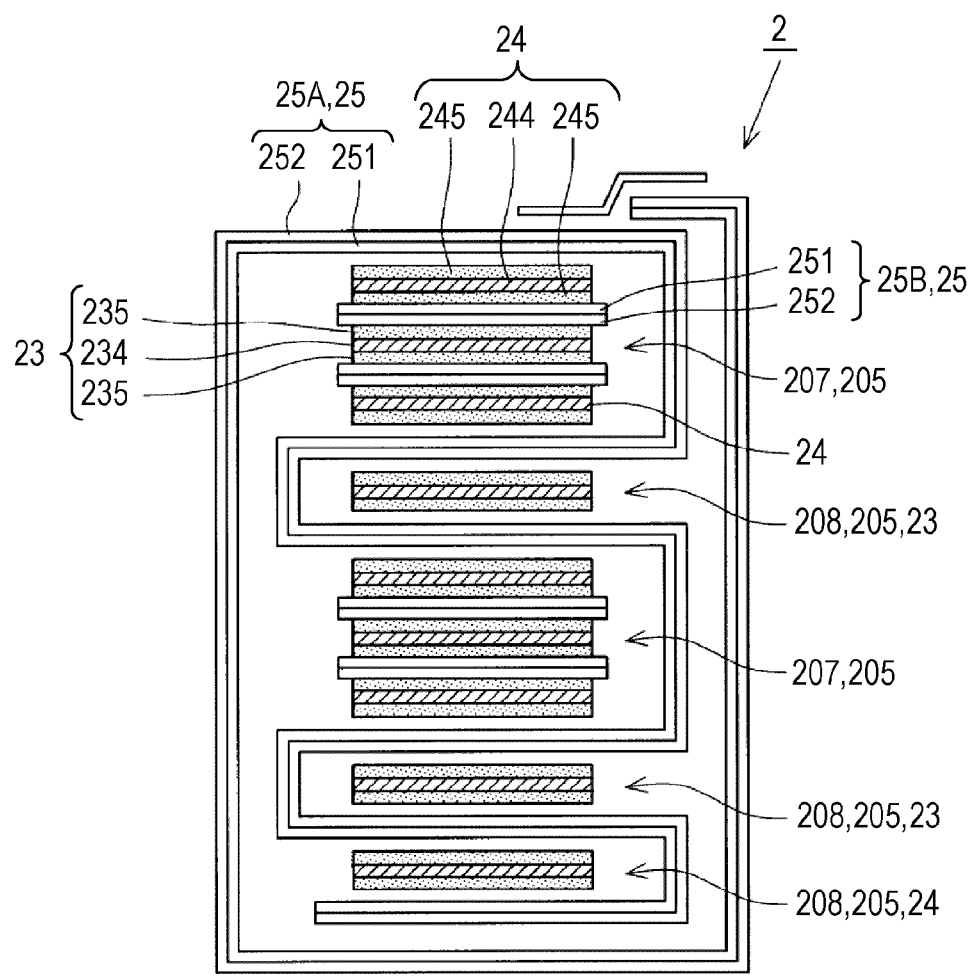
FIG. 10 is a schematic view of an electrode assembly according to still another embodiment.
Figure 10:
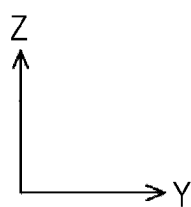

As shown in FIG. 9 and FIG. 10, the electrode assembly 2 may be formed of a plurality of electrode portions 205 where the positive electrodes 23 and the negative electrodes 24 are configured to form the plurality of electrode portions 205 each of which includes at least one of the positive electrode 23 and the negative electrode 24, and the electrode portions 205 arranged adjacently to each other are arranged such that the positive electrode 23 of one electrode portion 205 and the negative electrode 24 of the other electrode portion 205 face each other in an opposed manner. That is, the electrode assembly 2 includes the plurality of electrode portions 205, and each one of the plurality of electrode portions 205 may be formed of single (one) electrode (the positive electrode 23 or the negative electrode 24) or may be formed of the plurality of electrodes (the positive electrode 23 and the negative electrode 24). When the electrode portion 205 is formed of the plurality of electrodes (the positive electrode 23 and the negative electrode 24), the electrode portion 205 has the same configuration as the above-described electrode group 20 (that is, the electrode portion 205 is formed of the positive electrode 23, the negative electrode 24, and the short separator 25B). For example, the electrode assembly 2 which includes the plurality of electrode portions 205 is specifically described hereinafter.

The electrode assembly 2 shown in FIG. 9 includes a first electrode portion 206 which forms the electrode portion 205 arranged at a center portion in the Z axis direction, and second electrode portions 207 which form the remaining electrode portions 205 respectively. Both ends of the first electrode portion 206 in the Z axis direction are formed of the same electrode (in an example shown in FIG. 9, negative electrode 24), and both ends of the second electrode portion 207 in the Z axis direction are formed of different electrodes. In this case, the elongated separator 25A is arranged in a spiral shape so as to surround the first electrode portion 206 and to pass between the respective electrode portions 205 as viewed in the X axis direction (in a direction orthogonal to the Z axis direction) and, at the same time, is arranged such that the separator base material layer 251 faces the negative electrodes 24 of the electrode portions 205 arranged at ends in the Z axis direction between the respective electrode portions 205. In the electrode assembly 2 shown in FIG. 9, when the first electrode portion 206 is formed of the plurality of electrodes (the positive electrode 23 and the negative electrode 24), the electrode assembly 2 shown in FIG. 9 has the same configuration as the electrode assembly 2 shown in FIG. 6. Although the number of electrode portions 205 is the odd number in the example shown in FIG. 9, the number of electrode portions 205 may be the even number. In this case, the first electrode portion 206 is formed of one electrode portion 205 out of two electrode portions 205 arranged at the center portion in the Z axis direction. The specific number of electrodes (the positive electrodes 23 and the negative electrodes 24) which the second electrode portion 207 includes is not limited.

In the electrode assembly 2 shown in FIG. 10, the plurality of electrode portions 205 include electrode portions 208 each of which is formed of one electrode (the positive electrode 23 or the negative electrode 24), and electrode portions 209 each of which is formed of a plurality of electrodes (the positive electrode 23 and the negative electrode 24). In this case, both ends of each electrode portion 208, 209 in the Z axis direction are formed of the same electrode (the negative electrode 24 in the example shown in FIG. 10). In this case, the elongated separator 25A is arranged in a zigzag shape so as to pass between the respective electrode portions 205 as viewed in the X axis direction (the direction orthogonal to the Z axis direction) and, at the same time, the elongated separator 25A is arranged such that the separator base material layer 251 faces the negative electrodes 24 of electrode portions 205 arranged at ends between the respective electrode portions 205. In the electrode assembly 2, the specific number of electrode portions 208 each of which is formed of one electrode (the positive electrode 23 or the negative electrode 24) and the specific number of electrode portions 209 each of which is formed of a plurality of electrodes (the positive electrode 23 and the negative electrode 24) are not limited. Further, the specific number of electrodes (the positive electrodes 23 and the negative electrodes 24) which the electrode portion 209 includes is not limited.

In the electrode group 20 of the electrode assembly 2 of the above-mentioned embodiment, the short separator 25B has the separator base material layer 251 and the inorganic layer 252. However, the short separator 25B is not limited to such a configuration. For example, the short separator 25B may be formed of only a porous film (separator base material layer 251) made of polyethylene, polypropylene, cellulose, polyamide or the like. That is, the short separator 25B may have a configuration which includes no inorganic layer. Also with such a configuration, the elongated separator 25A having the separator base material layer 251 and the inorganic layer 252 is arranged in a state where the separator base material layer 251 faces the negative electrode 24 in an opposed manner between the electrode groups 20 arranged adjacently to each other and hence, the negative electrode 24 does not face the inorganic layer 252. Accordingly, it is possible to prevent the lowering of a capacity retention ratio or an output retention ratio of the energy storage device 1 caused by arranging the negative electrode 24 and the inorganic layer 252 of the separator 25 in an opposedly facing manner.

Figure 11:
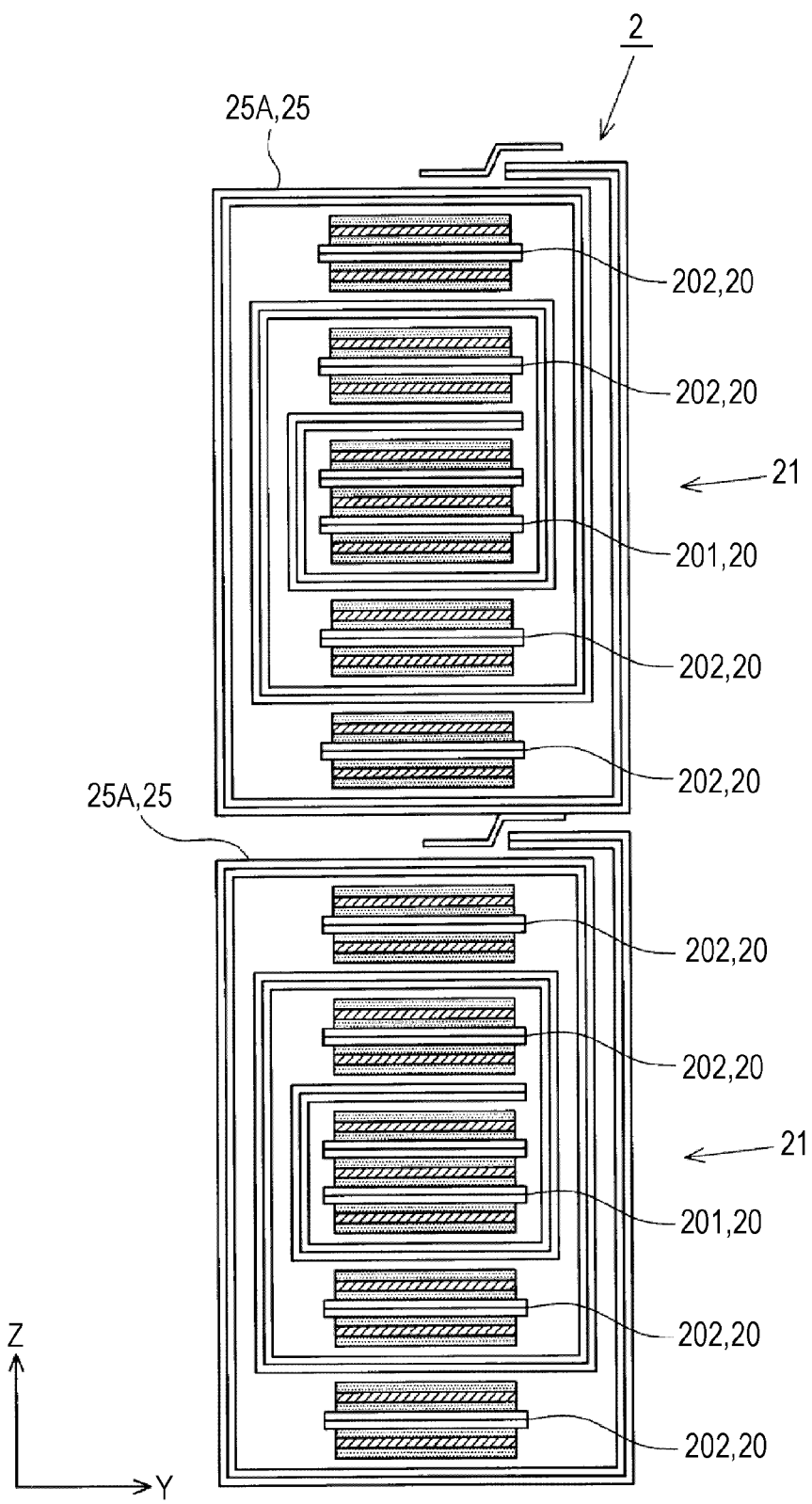
FIG. 11 is a schematic view of an electrode assembly according to still another embodiment.

Further, the energy storage device 1 of the above-mentioned embodiment has one set of the plurality of electrode groups 20 (electrode blocks) surrounded by one elongated separator 25A. However, the energy storage device 1 is not limited to such a configuration. For example, as shown in FIG. 11, the energy storage device 1 may include a plurality of electrode blocks 21 (two blocks in an example shown in FIG. 11). In this case, the respective electrode blocks 21 are arranged in the Z axis direction.

Further, in the above-mentioned embodiment, the description has been made with respect to the case where the positive electrode 23 and the negative electrode 24 have a rectangular shape. However, the positive electrode 23 and the negative electrode 24 are not limited to a rectangular shape. For example, the positive electrode 23 and the negative electrode 24 may have an approximately rectangular shape such as an approximately rectangular shape with rounded corner portions, an approximately rectangular shape with chamfered corner portions or an approximately rectangular shape with at least one rounded corner. In the same manner, the short separator 25B of the above-mentioned embodiment may have an approximately rectangular shape.

Further, in the above-mentioned embodiment, the description has been made with respect to the case where the energy storage device is used as a chargeable and dischargeable nonaqueous electrolyte secondary battery (for example, lithium ion secondary battery). However, a kind and a size (capacity) of the energy storage device can be arbitrarily set. Further, in the above-mentioned embodiment, the description is made with respect to a lithium ion secondary battery as one example of the energy storage device. However, the energy storage device is not limited to the lithium ion secondary battery. The present invention is also applicable to an energy storage device where lithium ion contributes to an electrochemical reaction, that is, a lithium ion capacitor or the like, for example.

Figure 12:
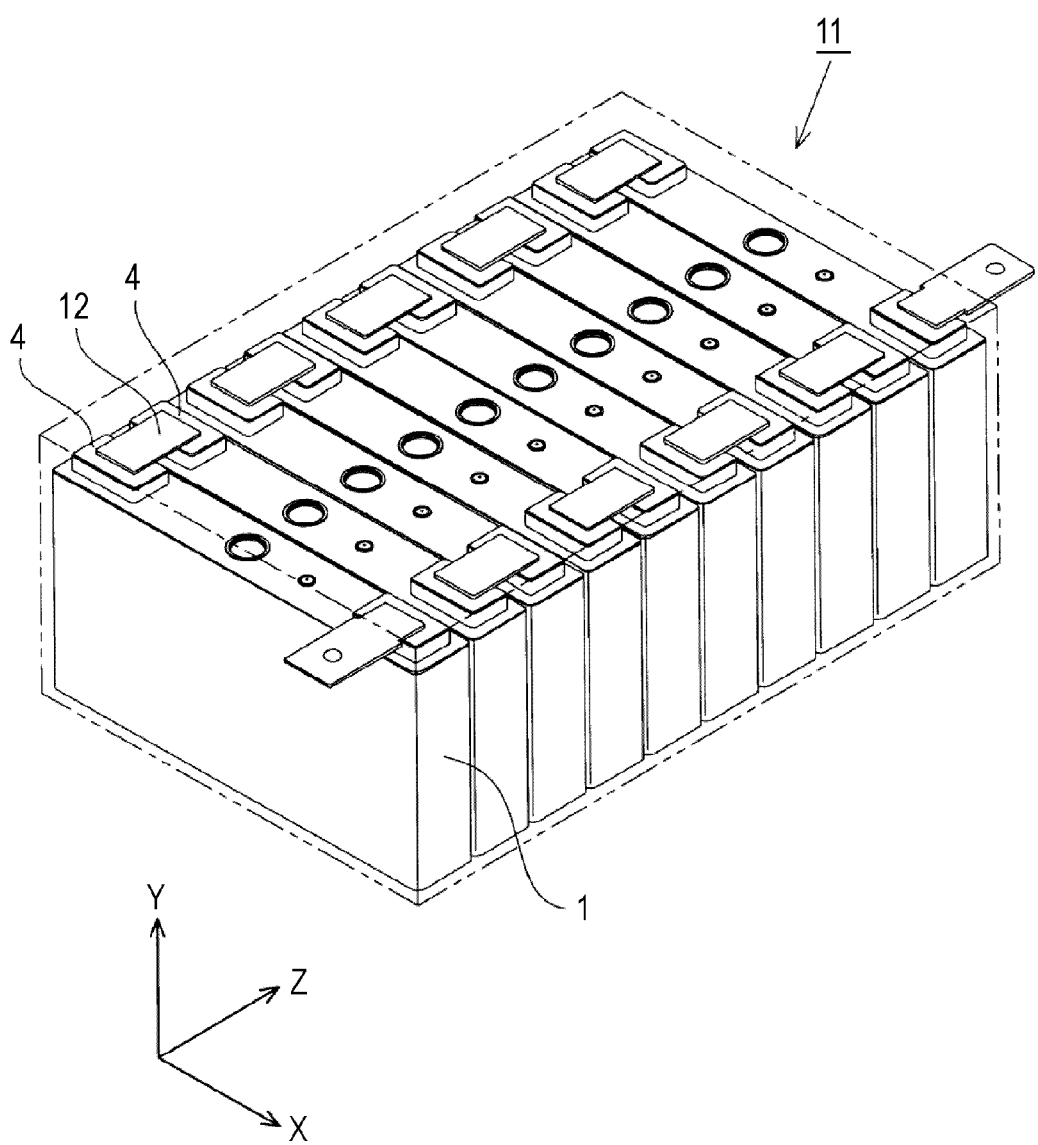
FIG. 12 is a perspective view of an energy storage apparatus including the energy storage devices according to this embodiment.
Figure 13:
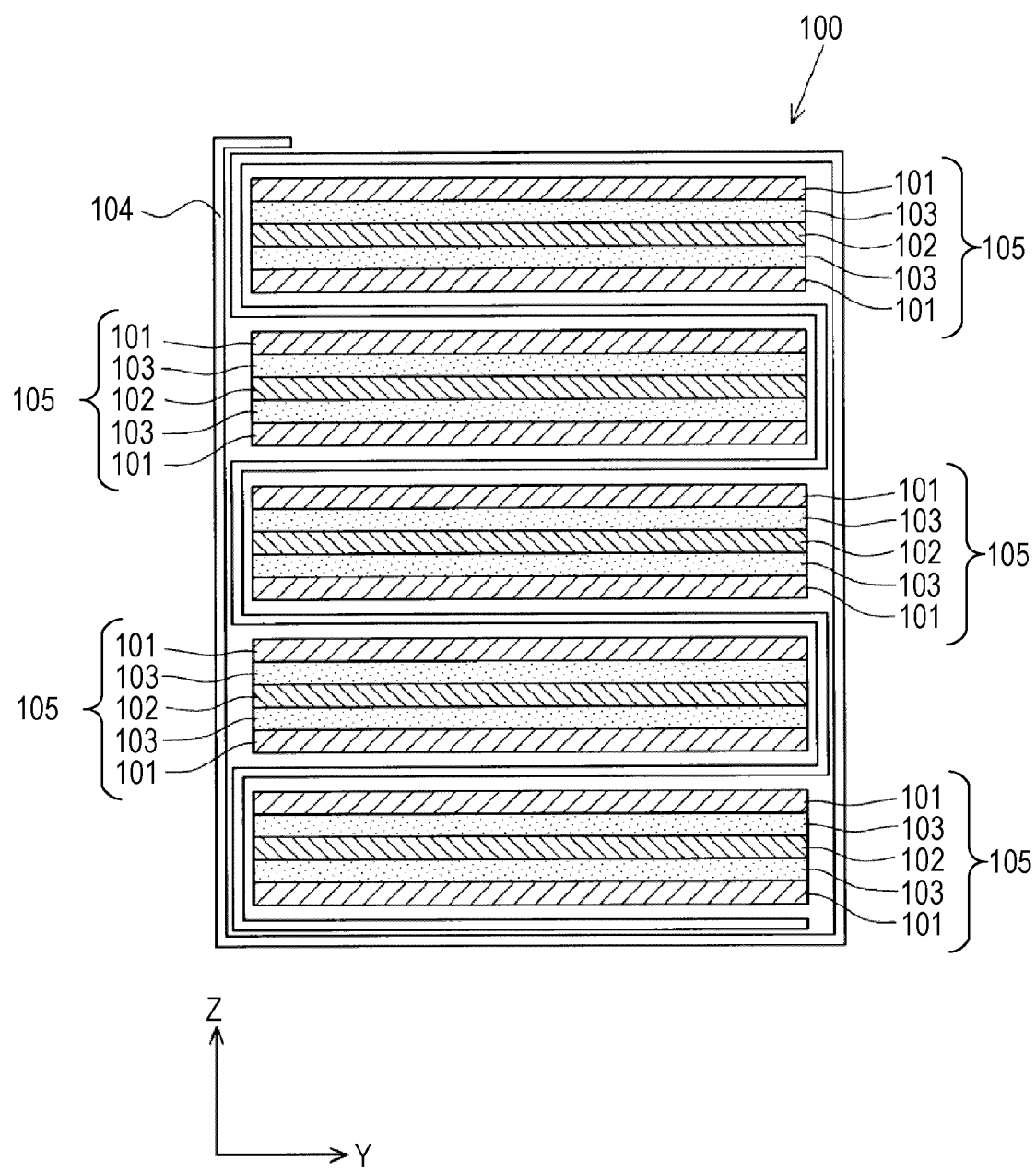
FIG. 13 is a schematic view of a conventional electrochemical element.
Figure 14:
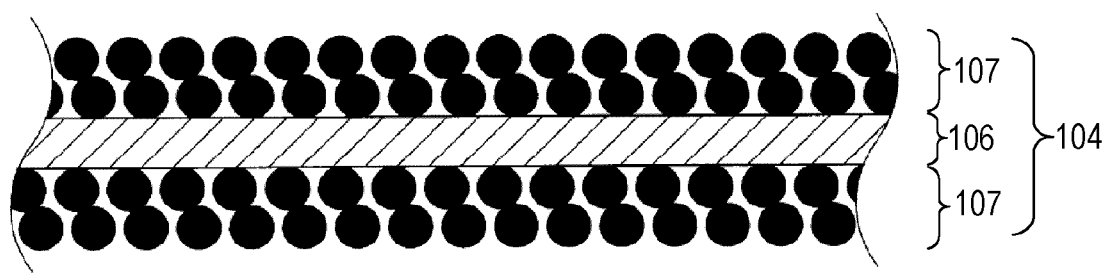
FIG. 14 is a schematic view describing a configuration of a second separator used for the electrochemical element.

The energy storage device (for example, a battery) may be used for the energy storage apparatus (a battery module when an energy storage device is formed of a battery) 11 shown in FIG. 12. The energy storage apparatus 11 includes at least two energy storage devices 1, and bus bar members 12 which electrically connect two (different) energy storage devices 1 to each other. In this case, it is sufficient that the technique of the present invention is applied to at least one energy storage device 1.

What is claimed is:
1. An energy storage device, comprising:
an electrode assembly which includes:
at least one positive electrode;
at least one negative electrode which is stacked alternately with the positive electrode; and
a strip-like elongated separator including a first base material layer and a first inorganic layer which is configured to overlap with the first base material layer,
wherein the elongated separator is arranged between the positive electrode and the negative electrode,
wherein the first base material layer of the elongated separator faces the negative electrode in a directly opposed manner between the positive electrode and the negative electrode,
wherein the first base material layer of the elongated separator is directly exposed to each of negative electrodes arranged at opposing ends of an entirety of the electrode assembly in a stacking direction of the positive electrode and the negative electrode.
2. The energy storage device according to claim 1, wherein the electrode assembly includes short separators having an approximately rectangular shape,
wherein positive electrodes and the negative electrodes form a plurality of electrode groups in each of which the positive electrode and the negative electrode are alternately arranged with a short separator of the short separators interposed therebetween,
wherein the plurality of electrode groups are arranged in a row in the stacking direction of the positive electrodes and the negative electrodes,
wherein the electrode groups which are arranged adjacently to each other are configured such that the positive electrode of one electrode group and the negative electrode of an other electrode group face each other in an opposed manner,
wherein the elongated separator is arranged between the electrode groups arranged adjacently to each other, and
wherein the first base material layer of the elongated separator is configured to face the negative electrode positioned at an end portion of the electrode group between the electrode groups.
3. The energy storage device according to claim 2, wherein the short separator includes a second base material layer and a second inorganic layer which is configured to overlap with the second base material layer, and
wherein, between the positive electrode and the negative electrode of each electrode group, the second base material layer of the short separator is configured to face the negative electrode in an opposed manner.
4. The energy storage device according to claim 1, wherein positive electrodes and the negative electrodes form a plurality of electrode portions which respectively include at least one of the positive electrode and the negative electrode,
wherein the plurality of electrode portions are arranged in a row in the stacking direction,
wherein the electrode portions, which are arranged adjacently to each other, are configured such that the positive electrode of one electrode portion and the negative electrode of an other electrode portion face each other in an opposed manner,
wherein the plurality of electrode portions include a first electrode portion arranged at a center portion in the stacking direction, and a second electrode portion which includes remaining electrode portions, wherein electrodes arranged at both ends of the first electrode portion in the stacking direction have a same polarity, wherein electrodes arranged at both ends of the second electrode portion in the stacking direction have different polarities, wherein the elongated separator is arranged in a spiral shape such that the elongated separator surrounds the first electrode portion and passes between respective electrode portions as viewed in a direction orthogonal to the stacking direction, and wherein, between the electrode portions, the first base material layer of the elongated separator is configured to face the negative electrode positioned at an end of the electrode portion in the stacking direction in an opposed manner.

5. The energy storage device according to claim 1, wherein positive electrodes and the negative electrodes form a plurality of electrode portions which respectively include at least one of the positive electrode and the negative electrode, wherein the plurality of electrode portions are arranged in a row in the stacking direction, wherein the electrode portions, which are arranged adjacently to each other, are configured such that the positive electrode of one electrode portion and the negative electrode of an other electrode portion face each other in an opposed manner, wherein both ends of each electrode portion in the stacking direction include a same electrode, wherein the elongated separator is arranged in a zigzag shape such that the elongated separator passes between the respective electrode portions as viewed in a direction orthogonal to the stacking direction, and wherein, between the electrode portions, the first base material layer of the elongated separator is configured to face the negative electrode positioned at an end of the electrode portion in the stacking direction in an opposed manner.

6. The energy storage device according to claim 1, wherein the elongated separator is arranged between the positive electrode and the negative electrode arranged adjacently to each other, and wherein the first base material layer is configured to face the negative electrode in an opposed manner between the positive electrode and the negative electrode arranged adjacently to each other respectively.

7. The energy storage device according to claim 1, wherein the first base material layer of the elongated separator prevents lowering of a capacity retention ratio or an output retention ratio of the energy storage device.

8. The energy storage device according to claim 1, wherein the first base material layer of the elongated separator includes an organic layer, and wherein the organic layer is configured to face the negative electrode in an opposed manner between the positive electrode and the negative electrode.

9. The energy storage device according to claim 8, wherein the organic layer includes one of a polyolefin resin, cellulose, and polyamide.

10. The energy storage device according to claim 4, wherein the first electrode portion includes the positive electrode and the negative electrode.

11. The energy storage device according to claim 1, wherein the elongated separator extends to wrap the electrode assembly, in which the positive and negative electrodes are stacked in the stacking direction, and wherein, in a wrapping portion of the elongated separator, the first inorganic layer faces opposite to the electrode assembly.

12. The energy storage device according to claim 1, wherein an outer end portion of the elongated separator is attached by a tape on the first inorganic layer.

13. The energy storage device according to claim 1, wherein the first inorganic layer is in a direct contact with the first base material layer at an outer end portion of the elongated separator.

14. The energy storage device according to claim 1, wherein the negative electrode is disposed between the positive electrode and the first base material layer of the elongated separator.

15. The energy storage device according to claim 2, wherein the short separator includes same materials as the elongated separator.

16. An electrode assembly of an energy storage device, the electrode assembly comprising:
at least one positive electrode;
at least one negative electrode which is stacked alternately with the positive electrode; and
a separator including a base material layer and an inorganic layer which overlaps with the base material layer,
wherein the separator is arranged between the positive electrode and the negative electrode,
wherein the base material layer of the separator directly faces the negative electrode such that the negative electrode is disposed between the positive electrode and the base material layer of the separator,
wherein the base material layer of the separator is directly exposed to at least one of negative electrodes arranged at an end of the electrode assembly in a stacking direction of the positive electrode and the negative electrode, and
wherein, in the stacking direction, the inorganic layer of the separator is exposed outside of the electrode assembly.

17. The electrode assembly according to claim 16, wherein the base material of the separator includes an organic layer, and
wherein the organic layer is configured to face the negative electrode in an opposed manner between the positive electrode and the negative electrode.

18. The electrode assembly according to claim 16, wherein the negative electrode includes a negative base material layer and a negative active material layer that overlaps with the negative base material layer, and
wherein the negative active material layer of the negative electrode is disposed between the negative base material layer of the negative electrode and the base material layer of the separator.

19. An energy storage device, comprising:
an electrode assembly which includes:
at least one positive electrode;
at least one negative electrode which is stacked alternately with the positive electrode; and
a strip-like elongated separator including a first base material layer and a first inorganic layer which is configured to overlap with the first base material layer,
wherein the elongated separator is arranged between the positive electrode and the negative electrode,
wherein the first base material layer of the elongated separator is configured to face the negative electrode in a directly opposed manner between the positive electrode and the negative electrode, wherein positive electrodes and negative electrodes form a plurality of electrode portions which respectively include at least one of the positive electrode and the negative electrode, wherein the plurality of electrode portions are arranged in a row in a stacking direction of the positive electrodes and the negative electrodes, wherein the electrode portions, which are arranged adjacently to each other, are configured such that the positive electrode of one of the electrode portions and the negative electrode of an other one of the electrode portions face each other in an opposed manner, wherein the plurality of electrode portions include a first electrode portion arranged at a center portion in the stacking direction, and a second electrode portion which includes remaining electrode portions, wherein electrodes arranged at both ends of the first electrode portion in the stacking direction have a same polarity, wherein electrodes arranged at both ends of the second electrode portion in the stacking direction have different polarities, wherein the elongated separator is arranged in a spiral shape such that the elongated separator surrounds the first electrode portion and passes between respective electrode portions as viewed in a direction orthogonal to the stacking direction, wherein, between the electrode portions, the first base material layer of the elongated separator is configured to face the negative electrode positioned at an end of the electrode portion in the stacking direction in an opposed manner, and wherein, in the stacking direction, each of the negative electrodes of the electrode assembly is located adjacent to and is directly exposed to the first base material layer of the elongated separator.

20. The energy storage device according to claim 1, wherein, in the stacking direction, the first base material layer of the elongated separator is located adjacent to and is directly exposed to:

a negative electrode of the negative electrodes located at an uppermost end of the entirety of the electrode assembly; and another negative electrode of the negative electrodes located at a bottommost end of the entirety of the electrode assembly.

* * * * *